Nov. 16, 1965 R. R. AMESBURY 3,217,584
SNAP FASTENER STUD AND METHOD OF FORMING SAME
Filed Dec. 11, 1962
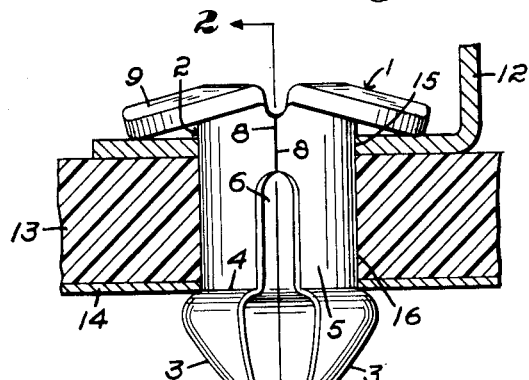
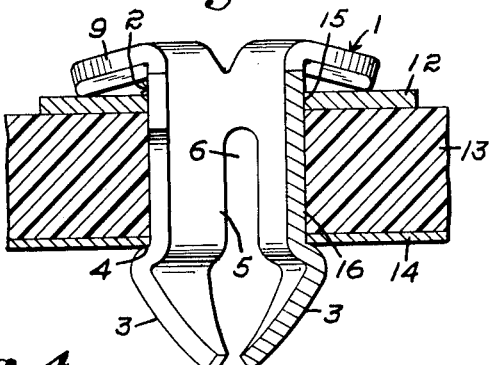
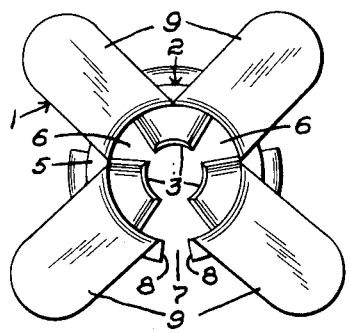
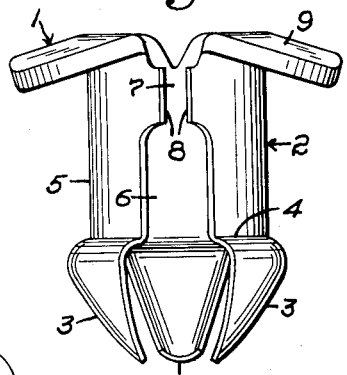
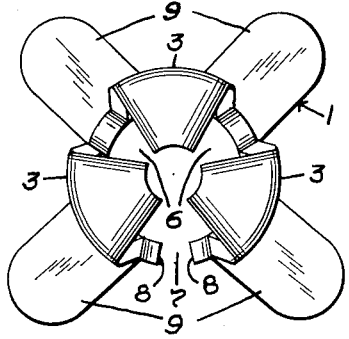
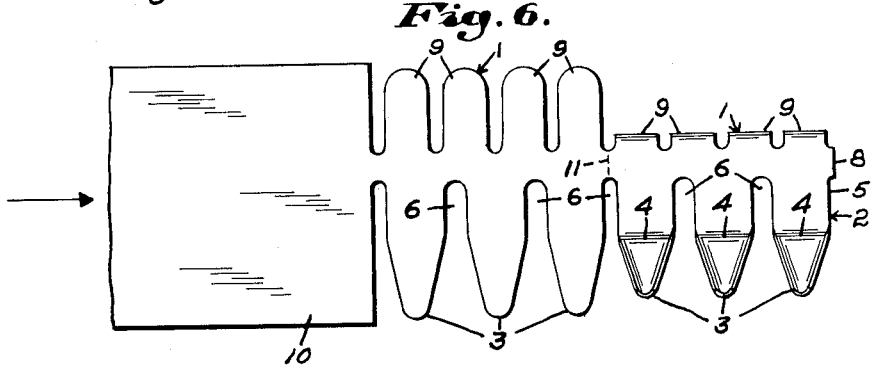
Inventor:
Robert R. Amesbury,
by Walter S. Jones
Atty.

United States Patent Office 3,217,584
Patented Nov. 16, 1965

3,217,584
SNAP FASTENER STUD AND METHOD OF
FORMING SAME
Robert R. Amesbury, Wellesley, Mass., assignor to United-Carr Incorporated, a corporation of Delaware
Filed Dec. 11, 1962, Ser. No. 243,904
1 Claim. (Cl. 85—80)

This invention relates to improvements in metal snap fastener stud members and the method of forming the same.

An object of the invention is to provide a simple, inexpensive, one-piece, flexible snap fastener stud having a flange, a yieldable shank extending from the flange; and the shank having a head, a neck and a shoulder, the entire length of the fastener being divided by a slot means so that the stud may be stamped from a thin sheet of metal, and formed around an anvil to provide a hollow snap fastener stud.

Another object of the invention is to form a snap fastener stud by a simple blanking, forming, and bending method to produce a stud not adapted to be formed by any known metal drawing method.

In the drawings:

FIG. 1 is an enlarged view, partly in section, showing one installation of the improved snap fastener stud member;

FIG. 2 is a section taken on the line 2—2 of FIG. 1;

FIG. 3 is a top plan view of the snap fastener member per se;

FIG. 4 is a side elevational view of the fastener shown in FIG. 3;

FIG. 5 is a bottom plan view of the fastener shown in FIG. 4; and

FIG. 6 is a plan view of a strip of metal showing the blanking operations prior to the blank being cut from the strip and bent around a forming anvil.

Heretofore, one-piece metal snap fastener stud members, of the general shape illustrated, have been formed by a series of so-called "drawing operations" and then slotting and head "bumping" operations in a suitable so-called eyelet machine or press. The resulting studs have had many uses. However, it has been impossible to manufacture that type of stud of substantial length and very small diameter by such known methods. It has been found that there is a use for relatively long shank studs with very small diameters for use in attaching electronic parts to a printed circuit board where a small hole ⅛ of an inch or less in diameter is needed. Furthermore, it has been found that small diameter long shank studs of different degrees of flexibility would prove very useful.

A desired stud, meeting the requirements for various applications, is illustrated by the drawings and will be described hereafter both as to stud construction and method of manufacture.

A particularly useful snap fastener stud is shown by FIGURES 3, 4, and 5. In this construction the stud has a base flange 1 and a hollow shank 2 divided longitudinally throughout its length, as clearly shown in FIG. 4. The shank has a head 3, a shoulder 4 and a neck 5, all as best shown in FIG. 4. The head is completely divided longitudinally by slots 6, herein shown as three in number, but any other suitable number may be used. One of the slots 6 is extended by a portion 7 through the remainder of the shank 2 and flange 1 (FIG. 4) so that together they form the complete longitudinal division of the stud. Adjacent the slot extension 7 there is provided, at opposite sides, abutment portions 8—8, the use for which will be described hereinafter.

It should be noted that the base flange 1 is divided into four independently yieldable angled portions 9, Any other suitable number of portions 9 may be used but it has been found that relatively narrow angled portions 9 will flex readily without taking a "set" when maintained under flexed tension.

The blanking method of forming the improved snap fastener studs described above is shown in FIG. 6 and two stages of the blanking and forming operation are shown. From a suitable strip of metal 10 the blanking tools provide the four portions that will make up the angled portions 9 of the flange 1 and the other three portions will make up the portions of the head 3. This form of the stud is shown in the mid-section of FIG. 6. At the right of that section is shown another fastener blank which has been shaped by suitable tools to provide the proper relation of the portions 9 of the flange 1 by bending the portions 9 at right angles to the blank. The proper forms for the head 3, shoulder 4 and neck 5 are accomplished by shaping and curving the three portions which go to form the shank 2. After the last forming operation is completed the blank is cut from the strip along the dotted line 11 as shown in FIG. 6 and then the formed blank is bent around a suitable shaped anvil not shown. Now that the improved snap fastener device and the operations of blanking have been described in connection with FIG. 6 it is believed that it will be understood by anyone skilled in the art that the improved stud may be formed in any suitable machine adapted to operate with progressive blanking and forming tools without any "drawing" operations. Therefore it is unnecessary to go into detail further with respect to the type of equipment, formation of the blanking tools or the folding tools in this application.

One type of installation with which the improved snap fastener studs may be used is roughly illustrated by FIGS. 1 and 2. In this case the device is shown in connection with electrically attaching a part 12 to a printed circuit board 13 carrying printed circuit portions 14. Since the printed circuit portions 14 are usually very narrow it is necessary to form relatively small holes through the printed circuit board, and it is also desirable that the fastener be held tightly in position and that the parts of the installation be clamped together strongly to provide for good electrical connection between the parts. Therefore, the relatively long shank small diameter stud is shown as having its head 3 passing through an aperture 15 in the part 12 and then through an aperture 16 in the printed circuit board 13 so that the shoulder 4 makes a tight contact against a printed circuit portion 14. The neck 5 is preferably longer than the thickness of the entire installation but the distance between the shoulder 4 and the lower ends of the angled portions 9 of the flange 1 is less than the total thickness of the parts to be assembled. When the stud is snapped into position the angled portions 9 will be flattened to some extent and together with the shoulder 4 place a tension on the parts, thereby causing a good electrical contact.

Another important feature of the invention is the provision of the abutment portions 8—8 adjacent the slot 7 which, when the stud is used in a small enough hole, will be brought into contact and thereby cause the three portions of the head, neck and shoulder of the shank to be compressed more tightly, during the snapping together operation and the final holding assembly, than would be the case if the shoulders 8—8 were not provided. It will also be understood, by anyone skilled in the art, that the tension of the fastener may be varied by changing the lengths of the abutments 8—8. Therefore, by slight changes in the blanking tools differently operating snap fastener studs may be provided. Furthermore, by interchangeability of tools the length of the shank may be varied by slight changes in the tools.

It will now be understood by anyone skilled in the art that various sizes, diameterwise, and lengths of shanks, plus relative location of the shoulder 4, plus the lengths of the abutments 8—8 and the slots 6 may be provided by mere interchangeability of tools whereas such variations in previously known studs was only possible heretofore by completely separate sets of tools for use in drawing, slitting and shaping. It will also now be appreciated that very small diameter studs may be produced according to the present invention, whereas similar small diameter studs, particularly having relatively long shanks, were impossible to produce.

While there has been illustrated and described a particular snap fastener stud construction, one useful installation of the snap fastener construction and a more or less diagrammatic blanking disclosure, by which the improved fastener stud may be made, it should be understood that the inventions are best defined by the following claim.

I claim:

A snap fastener stud formed from a single piece of material folded longitudinally to provide a split base flange and a generally tubular shank with spaced opposed edges throughout its length to provide flexibility for contraction and expansion of the base flange and shank, said shank having an enlarged head portion providing a shoulder, a neck portion and a plurality of slots extending into said shank from said head end and terminating in said shank short of said base flange thereby dividing said head and neck portions into a plurality of independently yieldable fingers, and the said opposed edges having circumferentially extending abuttable edge portions between the base flange and one of said slots and said abuttable edge portions being of no greater length than the distance from said base flange to said slot, said base flange including a plurality of resilient fingers inclined toward said head.

References Cited by the Examiner

UNITED STATES PATENTS

| | | | |
|---|---|---|---|
| 1,344,596 | 6/1920 | Schaefer | 85—5 |
| 1,978,087 | 10/1934 | Johnson | 85—5 |
| 2,560,530 | 7/1951 | Burdick | 85—5 |

FOREIGN PATENTS

| | | |
|---|---|---|
| 647,180 | 12/1950 | Great Britain. |

EDWARD C. ALLEN, *Primary Examiner.*